(12) United States Patent
Gipp et al.

(10) Patent No.: US 8,326,804 B2
(45) Date of Patent: Dec. 4, 2012

(54) CONTROLLING RESOURCE ALLOCATION FOR BACKUP OPERATIONS

(75) Inventors: Stephan Gipp, Inver Grove Heights, MN (US); Jeremy Swift, Plymouth, MN (US)

(73) Assignee: Symantec Corporation, Mountain View, CA (US)

( * ) Notice: Subject to any disclaimer, the term of this patent is extended or adjusted under 35 U.S.C. 154(b) by 359 days.

(21) Appl. No.: 12/134,853

(22) Filed: Jun. 6, 2008

(65) Prior Publication Data

US 2009/0307285 A1 Dec. 10, 2009

(51) Int. Cl.
*G06F 17/30* (2006.01)
(52) U.S. Cl. ........................................ 707/654
(58) Field of Classification Search .................. None
See application file for complete search history.

(56) References Cited

U.S. PATENT DOCUMENTS

| | | | |
|---|---|---|---|
| 5,218,695 A | 6/1993 | Noveck et al. | |
| 6,687,764 B2 | 2/2004 | Sonoda et al. | |
| 6,728,711 B2 * | 4/2004 | Richard | 1/1 |
| 6,754,679 B2 * | 6/2004 | Oheda | 1/1 |
| 6,976,039 B2 | 12/2005 | Chefalas et al. | |
| 6,985,915 B2 | 1/2006 | Somalwar et al. | |
| 7,007,143 B2 | 2/2006 | Cochran | |
| 7,389,311 B1 * | 6/2008 | Crescenti et al. | 1/1 |
| 7,418,546 B2 * | 8/2008 | Taguchi et al. | 711/112 |
| 7,606,844 B2 * | 10/2009 | Kottomtharayil | 1/1 |
| 7,769,722 B1 * | 8/2010 | Bergant et al. | 707/681 |
| 2003/0018656 A1 * | 1/2003 | Schutzman et al. | 707/203 |
| 2003/0033398 A1 * | 2/2003 | Carlson et al. | 709/223 |
| 2006/0277226 A1 * | 12/2006 | Chikusa et al. | 707/201 |
| 2007/0078892 A1 * | 4/2007 | Boyd et al. | 707/104.1 |
| 2008/0052326 A1 * | 2/2008 | Evanchik et al. | 707/204 |

FOREIGN PATENT DOCUMENTS

WO WO 03/034208 4/2003

OTHER PUBLICATIONS

International Search Report and Written Opinion for Application PCT/US2009/046615 mailed Dec. 3, 2009.

* cited by examiner

*Primary Examiner* — Fred I Ehichioya
*Assistant Examiner* — Michelle Owyang
(74) *Attorney, Agent, or Firm* — Rory D. Rankin; Meyertons, Hood, Kivlin, Kowert & Goetzel, P.C.

(57) ABSTRACT

Various embodiments of a computer system and methods are disclosed. In one embodiment, a computer system includes a backup application coupled to interconnected storage resources. The backup application creates a database of storage resources, wherein each database entry corresponds to one or more storage resources and is associated with one or more user-defined attributes describing the suitability of the associated resources for a backup operation. The backup application creates and stores a configuration of storage resources for a backup operation. Each storage resource is selected based on a value of an associated attribute. The storage resources may include logical unit numbers (LUNs), mount points providing access to LUNs, and hosts having physical access or network access through other hosts to mount points. An attribute specifies that the associated storage resources are either required or preferred for a backup operation. The database and configuration are created at backup application run time.

14 Claims, 10 Drawing Sheets

Resource Attribute Table 300

| | |
|---|---|
| Attribute 310A | Prefer for client backup. |
| Attribute 310B | Require for client backup. |
| Attribute 310C | Prefer for application backup. |
| Attribute 310D | Require for application backup. |
| Attribute 310E | Prefer for client restore. |
| Attribute 310F | Require for client restore. |
| Attribute 310G | Prefer for application restore. |
| Attribute 310H | Require for application restore. |
| Attribute 310I | Prefer for first specified image post processing. |
| Attribute 310J | Require for first specified image post processing. |
| Attribute 310K | Prefer for second specified image post processing. |
| Attribute 310L | Require for second specified image post processing. |

FIG. 3

CONTROLLING RESOURCE ALLOCATION FOR BACKUP OPERATIONS

BACKGROUND OF THE INVENTION

1. Field of the Invention

This invention relates to computer systems and, more particularly, to backup and restoration of data within computer systems.

2. Description of the Related Art

The increasing need to protect client and application data through backup and restore applications has led to ever more complex storage device configurations. Many of these configurations include disk-based storage. Disk-based storage may be preferred for data protection applications that require high-speed backup and restore performance and high-reliability, long-lived storage media. In order to provide higher capacity at lower cost in disk-based data protection systems, a variety of disk arrays may be utilized. Some of the configurations use to increase available disk capacity include commodity, attached disks, disks attached via a storage area network (SAN), and network attached storage (NAS), among others.

Unfortunately, with the increasing number of storage configurations comes an increased administrative burden. It may not be sufficient to specify a target storage location for backup-related operations with nothing more than a POSIX directory specification. In order to make efficient use of the available disk-based storage, backup applications may need to consider numerous configuration details about the location of the physical storage device, access paths, networking details, access credentials, among others. In addition, backup applications may unknowingly be configured to make resource allocation decisions that are at odds with site or installation policies. Backup applications may also be configured in a way that results in suboptimal performance due to a lack of knowledge of the details of the network path connecting the protected client and the disk-based storage.

Previous efforts to manage storage configurations used a combination of disparate tools, each designed to enable configuration of a particular resource without consideration of larger network issues. Unfortunately, such combinations have not provided administrators with a way to achieve fine-grained control of the increasingly complex network of storage resources used to provide data protection. In view of the above, an effective system and method for managing the configuration of disk-based resources that accounts for these issues is desired.

SUMMARY OF THE INVENTION

Various embodiments of a computer system and methods are disclosed. In one embodiment, a computer system includes a backup application coupled to a plurality of interconnected storage resources. The backup application creates a database of storage resources, wherein each entry in the database corresponds to one or more storage resources and is associated with one or more user-defined attributes. Each attribute describes the suitability of the associated resources for use in a backup operation. The backup application creates a configuration of storage resources to be used in a backup operation. Each storage resource in the configuration is selected from the database based on a value of an associated attribute. The backup application stores the configuration for use in subsequent backup operations.

In one embodiment, the storage resources selected for use in the backup operation include one or more of a storage logical unit number (LUN), a group of LUNs, a mount point providing access to a LUN or group of LUNs, a group of mount points providing access to one or more LUNs, a host having physical access to one or more mount points, a group of hosts having physical access to one or more mount points, and one or more hosts having network access to a host having physical access to one or more mount points. In a further embodiment, an attribute specifies that the associated storage resources are either required or preferred for a particular backup operation. In still further embodiments, each attribute describes the suitability of the associated resources for use in one of image backup, image restore, backup image synthesizing, backup image staging, backup image duplication, backup image replication, backup image compressing, backup image decompressing, backup image de-duplication, and backup image indexing.

In a further embodiment, the database of storage resources and the configuration are created at run time of the backup application. In one further embodiment, either a data source or a data target of the backup operation is a client in a client-server system. In another further embodiment, either a data source or a data target of the backup operation is an application program.

These and other embodiments will become apparent upon consideration of the following description and accompanying drawings.

BRIEF DESCRIPTION OF THE DRAWINGS

FIG. 3 illustrates one embodiment of a resource attribute table.

Figure 1:
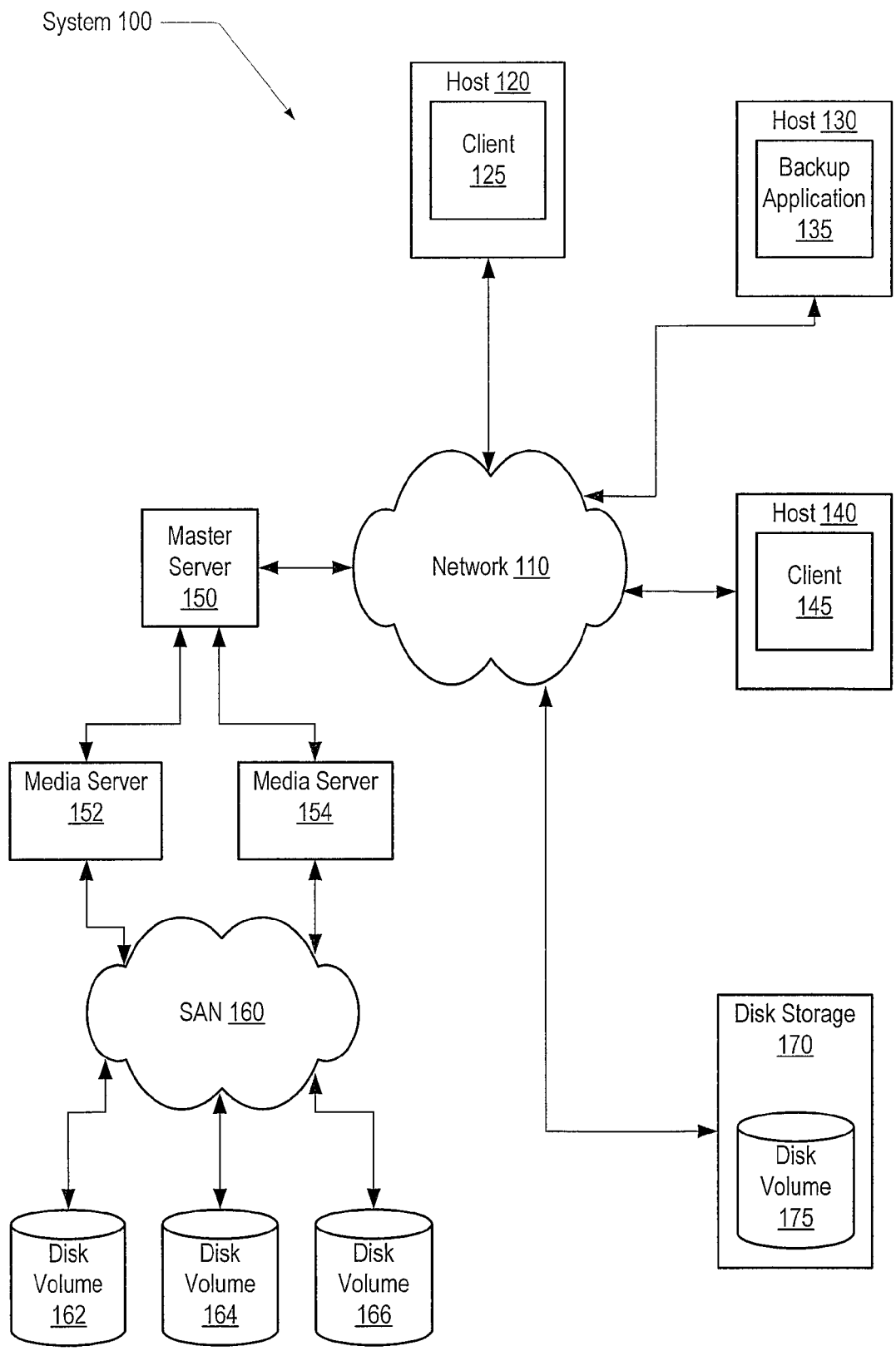
FIG. 1 is a generalized hardware block diagram of one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a generalized hardware block diagram of one embodiment of a computer system 100. As shown, system 100 includes a network 110 interconnecting hosts 120, 130, 140, a master server 150, and disk storage 170. Network 110 may include the Internet, an intranet and/or wired or wireless communication mechanisms such as, for example, Ethernet, LAN (Local Area Network), WAN (Wide Area Network), or modem, among others. Each of hosts 120, 130, and 140 may be a computer system that includes one or more operating systems that support various software application programs such as databases, application servers, web servers, office productivity tools, and various other client or server programs. For example, in the illustrated embodiment, clients 125 and 145 are shown operating on hosts 120 and 145, respectively. Also, a backup application 135 is shown operating on host 130. Master server 150 is shown coupled to media servers 152 and 154, which are in turn coupled through a storage area network (SAN) 160 to disk volumes 162, 164, and 166. Disk storage 170 includes a locally attached disk volume 175.

During operation, backup application 135 may be configured to protect data from one or more of the hosts in system 100 by executing various backup-related operations such as backup, restore, and various backup-related post-processing operations. For example, backup application 135 may store backup datasets and associated metadata on one or more of disk volumes 162, 164, 166, and 175. Backup application 135 may convey data targeted to disk volumes 162, 164, 166 to master server 150, which in turn may use the services provided by media servers 152 and 154 to access the targeted storage space of disk volumes 162, 164, and 166. Efficient allocation of resources including backup storage volumes, the servers that provide connectivity to these volumes, and the network paths that provide access to these volumes will be described in greater detail below.

System 100 is illustrative of a wide variety of computer system topologies. In alternative embodiments, clients 125 and 145 and backup application 135 may be hosted by more or fewer than the illustrated number hosts, or, in one embodiment, a single host. Any of hosts 120, 130, 140, server 150, and disk storage 170 may be coupled to network 110 through a firewall (not shown) for security purposes. Similarly, in alternative embodiments, SAN 160 may couple any number of servers, disk volumes, and other hosts to each other. These and other variations will be apparent to one of ordinary skill in the art.

Figure 2:
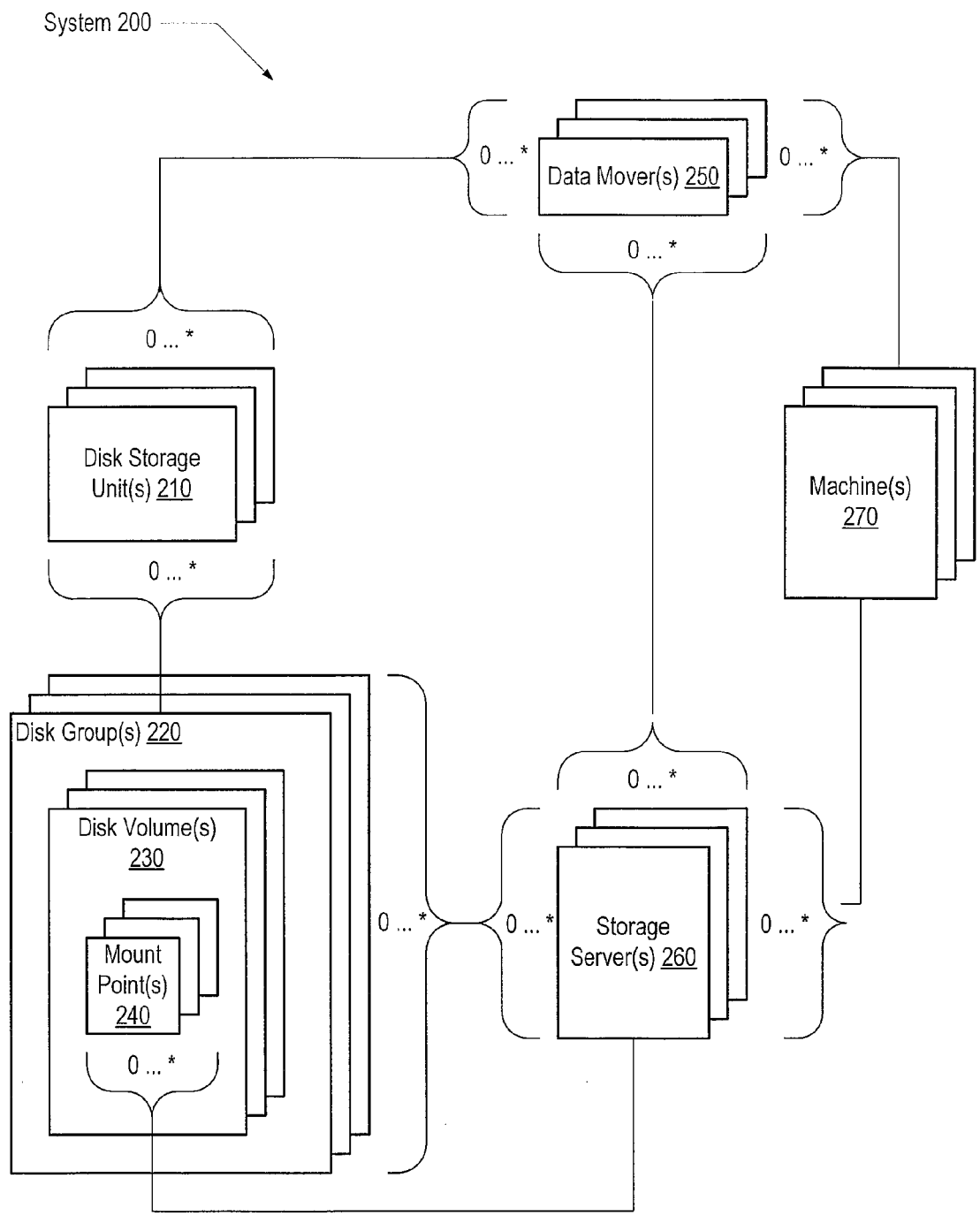
FIG. 2 is a generalized block diagram of one embodiment of a disk storage system that may operate within computer system.

Turning now to FIG. 2, a generalized block diagram of one embodiment of a disk storage system 200 that may operate within computer system 100 is shown. System 200 is a logical representation of software entities that may be used during backup-related operations intended to protect data in a computer system such as system 100. The logical components illustrated in FIG. 2 accommodate any of a wide variety of physical configurations represented by system 100. In the illustrated embodiment, system 200 includes disk storage units 210, disk groups 220, data movers 250, storage servers 260, and machines 270, which represent some of the logical components of a disk storage unit software model. A disk storage unit is a logical representation of any of a variety of disk storage entities including one or more storage devices such as the disk volumes illustrated in FIG. 1, whether connected directly to a machine, or through a SAN, as network attached storage (NAS), etc. In addition, disk storage entities may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), and optical storage devices.

Each disk storage unit 210 includes a disk group 220, which may include and provide physical storage within any number of disk volumes 230. Disk groups 220 and disk volumes 230 represent some of the logical components of a disk storage unit software model. If no disk volumes 230 are included in a disk group 220, no storage space is available in that group. Each disk group 220 is associated with any number of disk storage units 210. Therefore, each disk group 220 may be shared by multiple disk storage units 210, but each disk storage unit 210 includes only one disk group 220.

Each disk storage unit 210 may be associated with any number of data movers 250 that provide a data path between the physical storage of a storage unit 210 and a machine 270. Each data mover 250 may be associated with one machine 270. Each machine 270 may be associated with any number of data movers 250. Each data mover 250 may also be associated with any number of storage servers 260 that provides access to actual storage within disk groups 220. Each disk group 220 may be associated with any number of storage servers 260 and each storage server 260 may be associated with any number of disk groups 220. If a disk group 220 is associated with multiple storage servers 260, the actual storage in that disk group 220 is shared among the associated storage servers 260. In one embodiment, a storage server 260 that is associated with a disk group 220 has access to every disk volume 230 included therein. Each disk volume 230 may be associated with any number of mount points 240, through which they are coupled to storage servers 260. A mount point describes access to physical storage in a disk volume. Each mount point 240 is associated with one storage server 260 and one disk volume 230. An individual storage server 260 may be associated with any number of mount points 240. Accordingly, each disk volume 230 may be accessible through multiple mount points 240 to any number of storage servers 260. If no mount points 240 are associated with a disk volume 230, physical storage in that disk volume is not accessible.

Each storage server 260 may be associated with one machine 270. Each machine 270 may be associated with any number of storage servers 260 and any number of data movers 250. Each storage server 260 may be associated with any number of data movers 250. A machine 270 may be associated with a physical entity such as a host computer that has data to be protected by a backup application.

During operation, a connection may be established between a machine 270 and a selected storage server 260 in order to access storage within a selected disk storage unit 210. The selected storage server 260 may provide access to selected disk volumes 230 within a selected disk group 220 of the selected disk storage unit 210 via selected mount points 240. Once storage access has been achieved, a connection between machine 270 and a selected data mover 250 that is associated with the selected storage server and selected disk storage unit may be used to move data between machine 270 and the selected disk volumes 230. Further details concerning the allocation of storage resources are presented below.

In order to manage the complexity of the variety of storage resources represented by disk storage system 200, a number of data structures may be used to provide fine-grained administrative control of storage resources when executing data backup-related operations. For example, in one embodiment a user or administrator may define various configuration elements. Each configuration element may be assigned one or more attributes that may also be defined by a user or administrator. Examples of defined configuration elements include a storage logical unit number (LUN), a group of LUNs, a mount point providing access to a LUN or group of LUNs, a group of mount points providing access to one or more LUNs, a host having physical access to one or more mount points, a group of hosts having physical access to one or more mount points, and one or more hosts having network access to a host having physical access to one or more mount points, etc. Examples of attributes that may be defined include preferred for client backup, required for client backup, preferred for application backup, required for application backup, preferred for client restore, required for client restore, preferred for application restore, required for application restore, preferred for a particular post-processing operation, and required for a particular post-processing operation. Examples of post-processing operations include image synthesizing, image staging, image duplication, image replication, image compressing, image decompressing, image de-duplication, and image indexing. These and other similar configuration elements, attributes, and post-processing operations are possible and are contemplated.

Turning now to FIG. 3, one embodiment of a resource attribute table 300 is shown. Resource attribute table 300 may include any number of attributes such as attributes 310A-310L, as illustrated. Note that throughout this disclosure, drawing features identified by the same reference number followed by a letter (e.g., attributes 310A-310L) may be collectively referred to by that reference number alone (e.g., attributes 310). Each attribute 310 in table 300 may include a value. For example, attribute 310A may have a value of 'prefer for client backup,' attribute 310B may have a value of 'require for client backup,' etc., as illustrated. An administrator or user may define an attribute by creating a new attribute 310 entry in table 300 and assigning a user-defined value to the entry.

Figure 4:
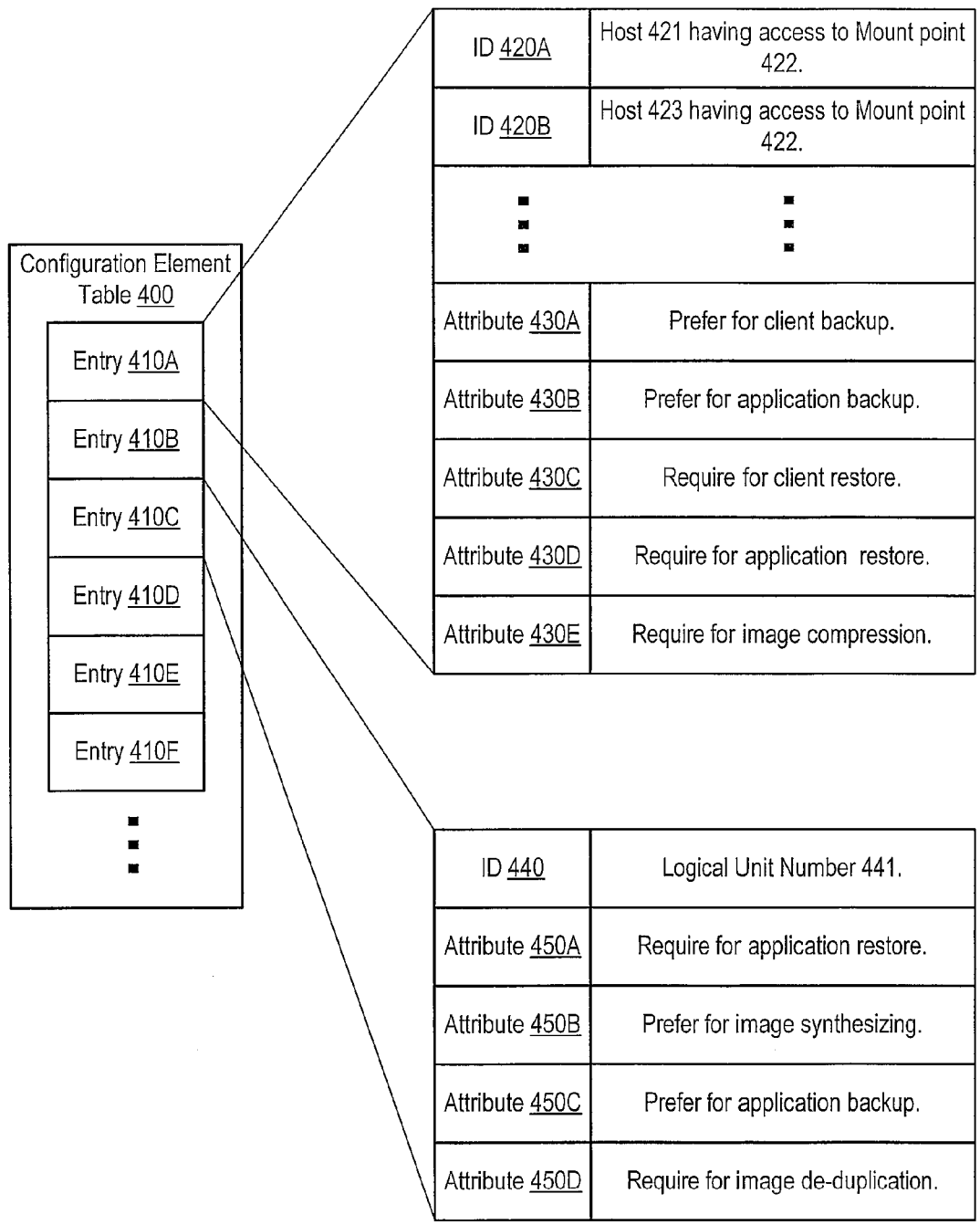
FIG. 4 illustrates one embodiment of a configuration element table.

FIG. 4 illustrates one embodiment of a configuration element table 400. Configuration element table 400 may include any number of entries such as entries 410A-410F, as illustrated. Each entry 410 in table 400 may include one or more IDs 420 and one or more associated attributes 430. For example, entry 410A includes IDs 420A, 420B, etc. and attributes 430A-430E. IDs 420A, 420B, etc. may represent a group of elements that share a common asset of attributes. For example, 420A and 420B etc. may be elements that have access to a common mount point. More specifically, ID 420A may identify a host 421 that has access to a mount point 422 and ID 420B may identify a host 423 that also has access to a mount point 422. Attributes that are assigned to the group of elements defined by entry 410A may include attribute 430A having a value of 'prefer for client backup,' attribute 430B having a value of 'prefer for application backup,' attribute 430C having a value of 'require for client restore,' attribute 430D having a value of 'require for application restore,' and attribute 430E having a value of 'require for image compression.' By way of example, entry 410C is also shown and include a single ID 440 having a value of 'logical unit number 441.' Attributes that are assigned to logical unit number 441 include attribute 450A having a value of 'require for application restore,' attribute 450B having a value of 'prefer for image synthesizing,' attribute 450C having a value of 'prefer for application backup,' and attribute 450D having a value of 'require for image de-duplication.'

Figure 5:
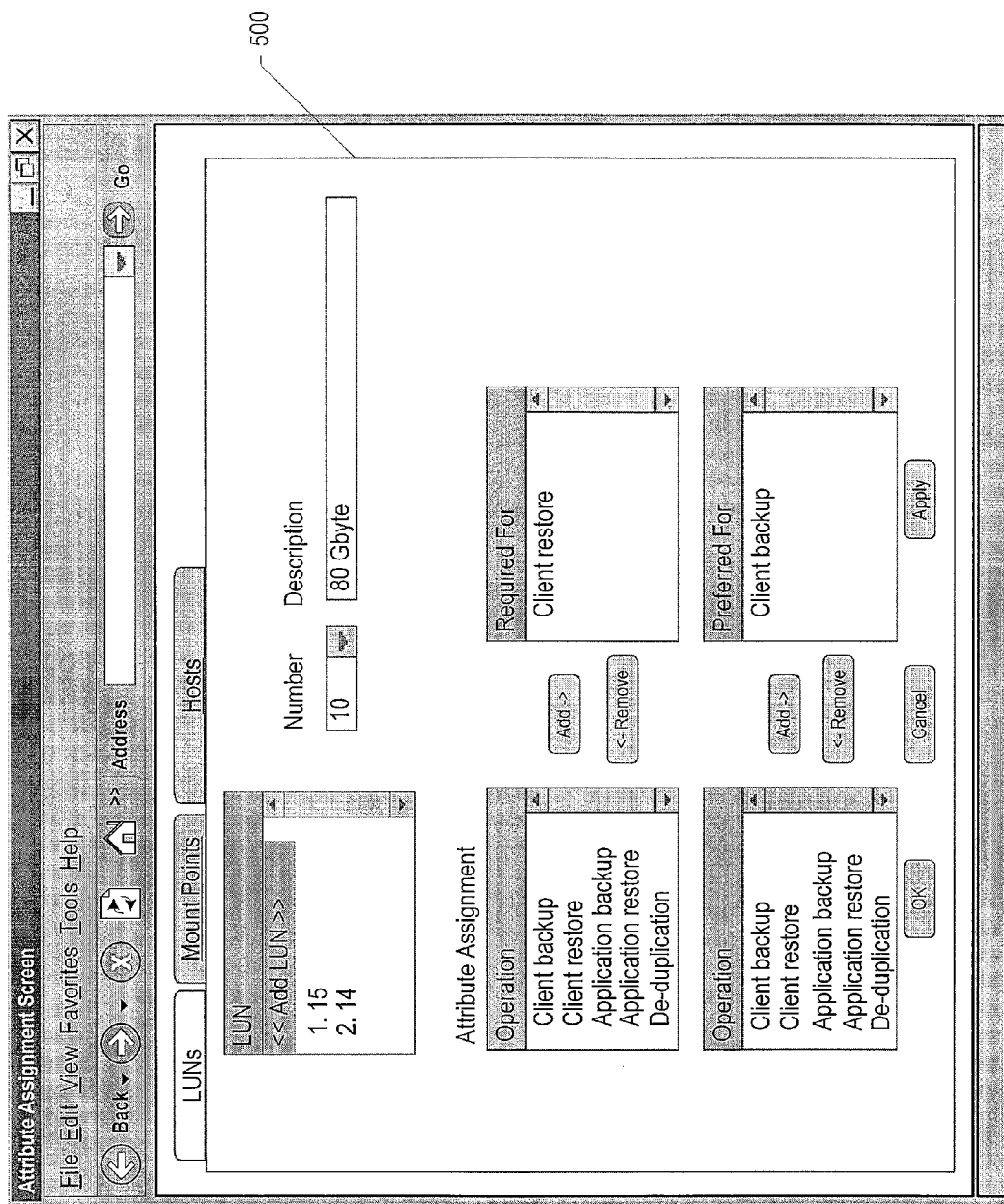
FIG. 5 illustrates one embodiment of a LUNs tab of an attribute assignment window.

FIG. 5 illustrates one embodiment of a LUNs tab 500 of an attribute assignment window that may be used to select or define LUNs and assign attributes to LUNs. An attribute assignment window may include the standard features of a web browser window such as drop-down menus, a navigation bar, and an address field. Within the browser window are shown three tabs labeled 'LUNs', 'Mount Points,' and 'Hosts'. In alternative embodiments, additional tabs may be included, such as a tab from which a subscriber may configure the operation of the security system. As illustrated in FIG. 5, the LUNs tab is selected. On the LUNs tab, the user or administrator may be presented with a number of user input items. A scrollable selection box is shown near the top of the LUNs tab from which the subscriber may choose a LUN or add a new LUN to the system. Available LUNs are shown in the scrollable selection box. In the illustration, the option to add a new LUN is selected. When adding a new LUN, a number may be selected or entered in a drop-down list box that appears to the right of the scrollable selection box and a description may be entered in an input field that appears to the right of the drop-down list box. Once a new or existing LUN is selected, attributes may be assigned to or removed from the LUN via a set of four scrollable selection boxes shown in the lower portion of the LUNs tab. A first scrollable selection box presents a list of available attribute operations that may be added to a list of the operations for which the selected LUN is required. Attributes requiring the selected LUN that have been added are presented in a second scrollable selection box to the right of the first scrollable selection box. A third scrollable selection box presents a list of available attribute operations that may be added to a list of the operations for which the selected LUN is preferred. Attributes preferring the selected LUN that have been added are presented in a fourth scrollable selection box to the right of the third scrollable selection box. Attributed may be moved between the first and second scrollable selection boxes and between the third and fourth scrollable selection boxes via conventional add and remove buttons. Once the desired attribute assignments have been made, an OK button or an Apply button may be selected to save the selections such as by adding entries to table 300 and 400. A Cancel button is provided to clear selections from the LUNs tab without saving them.

Figure 6:
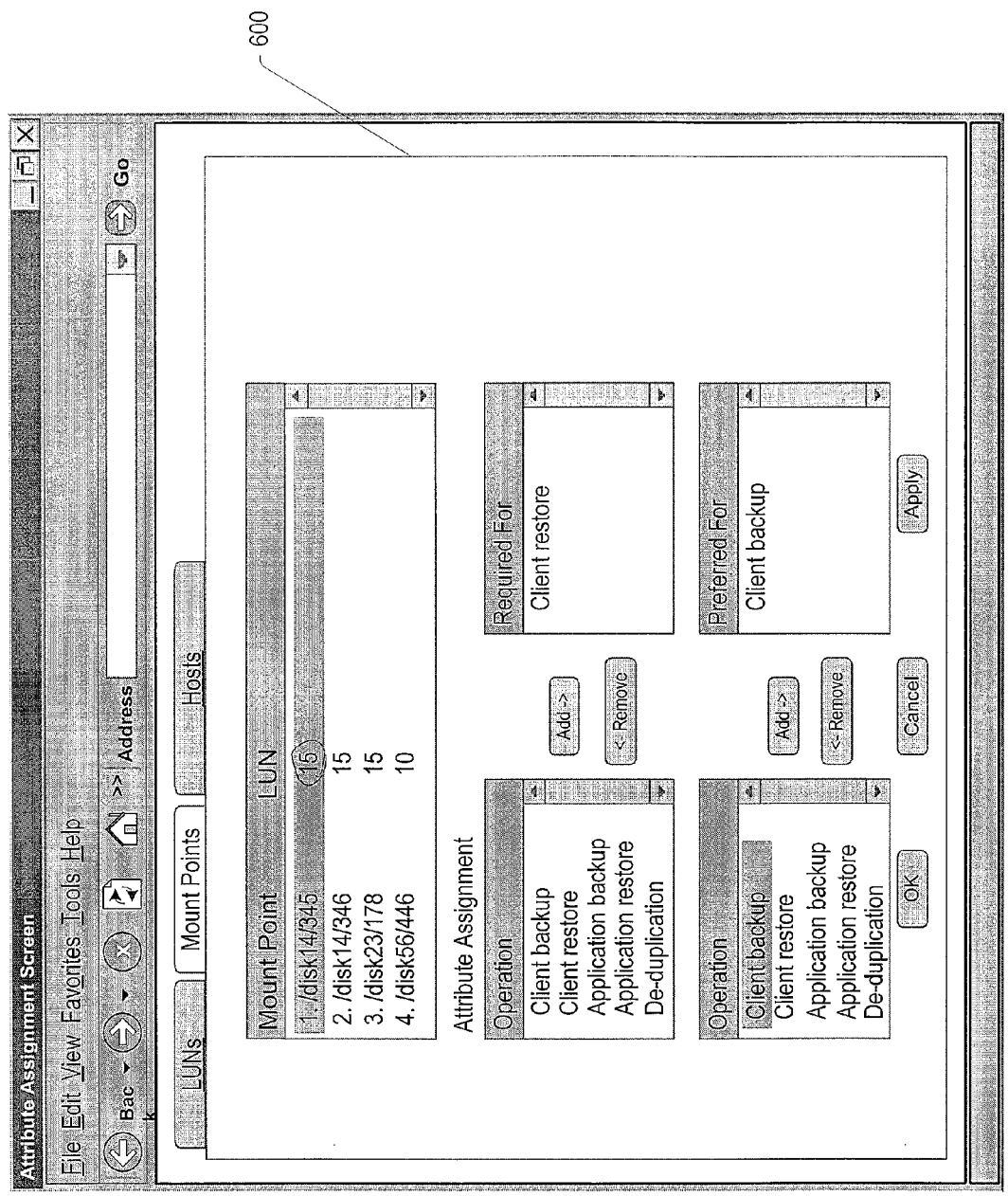
FIG. 6 illustrates one embodiment of a Mount Points tab of an attribute assignment window.

FIG. 6 illustrates one embodiment of a Mount Points tab 600 of an attribute assignment window that may be used to select a configuration element characterized by a particular mount point having access to a particular LUN and assign attributes to the configuration element. An attribute assignment window may include the standard features of a web browser window such as drop-down menus, a navigation bar, and an address field. As illustrated in FIG. 6, the Mount Points tab is selected. On the Mount Points tab, the user or administrator may be presented with a number of user input items. A scrollable selection box is shown near the top of the Mount Points tab from which the subscriber may choose a mount point that is associated with a particular LUN. Available configuration elements are shown in the scrollable selection box. In the illustration, a mount point defined by the path '/disk14/345' and associated with LUN 15 is selected. Once an existing configuration element is selected, attributes may be assigned to or removed from the configuration element via a set of four scrollable selection boxes shown in the lower portion of the Mount Points tab. A first scrollable selection box presents a list of available attribute operations that may be added to a list of the operations for which the selected configuration element is required. Attributes requiring the selected configuration element that have been added are presented in a second scrollable selection box to the right of the first scrollable selection box. A third scrollable selection box presents a list of available attribute operations that may be added to a list of the operations for which the selected configuration element is preferred. Attributes preferring the selected configuration element that have been added are presented in a fourth scrollable selection box to the right of the third scrollable selection box. Attributed may be moved between the first and second scrollable selection boxes and between the third and fourth scrollable selection boxes via conventional add and remove buttons. Once the desired attribute assignments have been made, an OK button or an Apply button may be selected to save the selections such as by adding entries to table 300 and 400. A Cancel button is provided to clear selections from the Mount Points tab without saving them.

Figure 7:
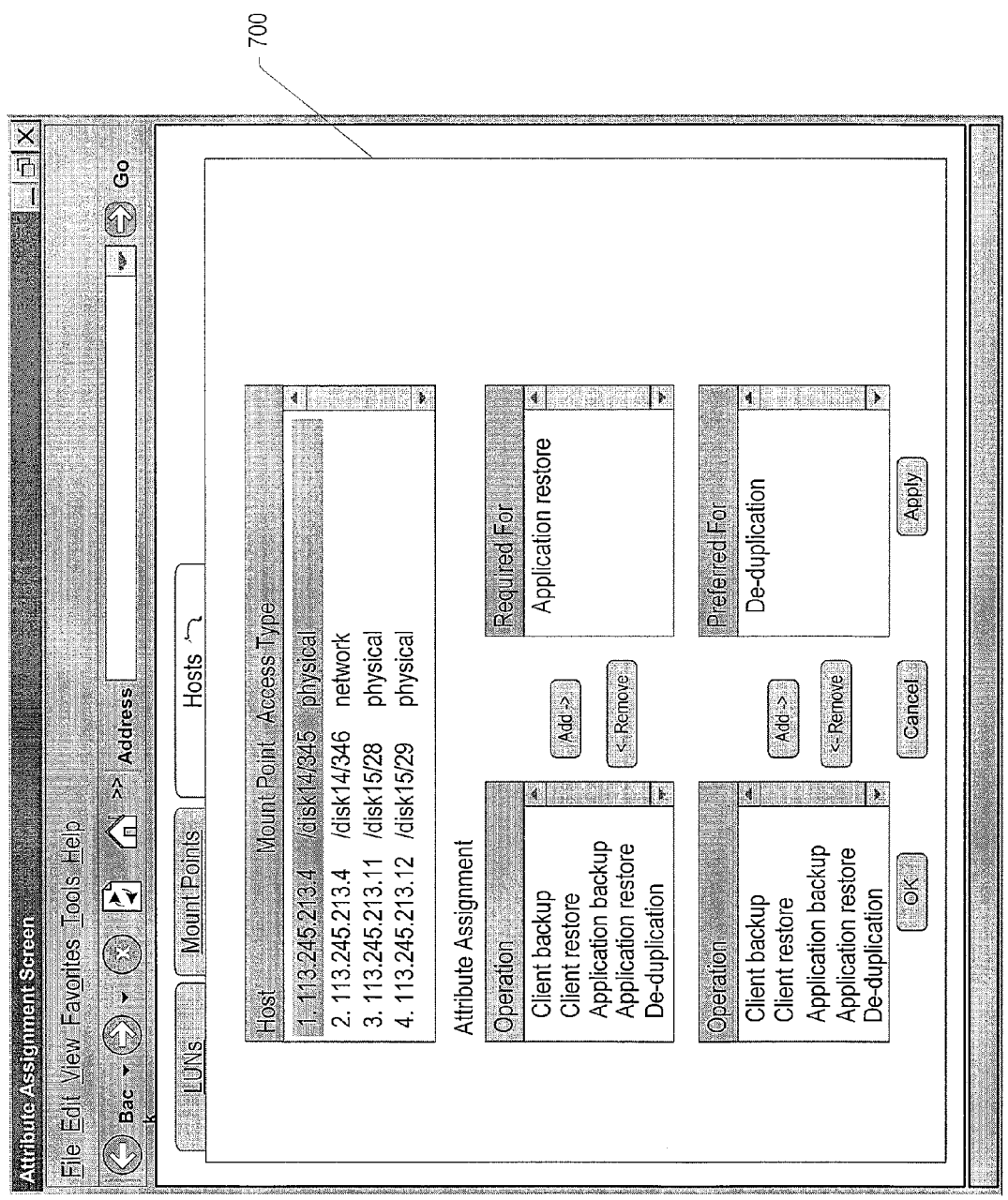
FIG. 7 illustrates one embodiment of a Hosts tab of an attribute assignment window.

FIG. 7 illustrates one embodiment of a Hosts tab 700 of an attribute assignment window that may be used to select a configuration element characterized by a particular host having either physical or network access to a particular mount point and assign attributes to the selected configuration element. An attribute assignment window may include the standard features of a web browser window such as drop-down menus, a navigation bar, and an address field. As illustrated in FIG. 7, the Hosts tab is selected. On the Hosts tab, the user or administrator may be presented with a number of user input items. A scrollable selection box is shown near the top of the Hosts tab from which the subscriber may choose a host having a desired type of access to a particular mount point. Available host, mount point, access type combinations are shown in the scrollable selection box. In the illustration, a host defined by IP address 113.245.213.4 having physical access to a mount point defined by the path '/disk14/345' is selected. Once an existing configuration element is selected, attributes may be assigned to or removed from the configuration element via a set of four scrollable selection boxes shown in the lower portion of the Hosts tab. A first scrollable selection box presents a list of available attribute operations that may be added to a list of the operations for which the selected configuration element is required. Attributes requiring the selected configuration element that have been added are presented in a second scrollable selection box to the right of the first scrollable selection box. A third scrollable selection box presents a list of available attribute operations that may be added to a list of the operations for which the selected configuration element is preferred. Attributes preferring the selected configuration element that have been added are presented in a fourth scrollable selection box to the right of the third scrollable selection box. Attributed may be moved between the first and second scrollable selection boxes and between the third and fourth scrollable selection boxes via conventional add and remove buttons. Once the desired attribute assignments have been made, an OK button or an Apply button may be selected to save the selections such as by adding entries to table 300 and 400. A Cancel button is provided to clear selections from the Hosts tab without saving them.

Figure 8:
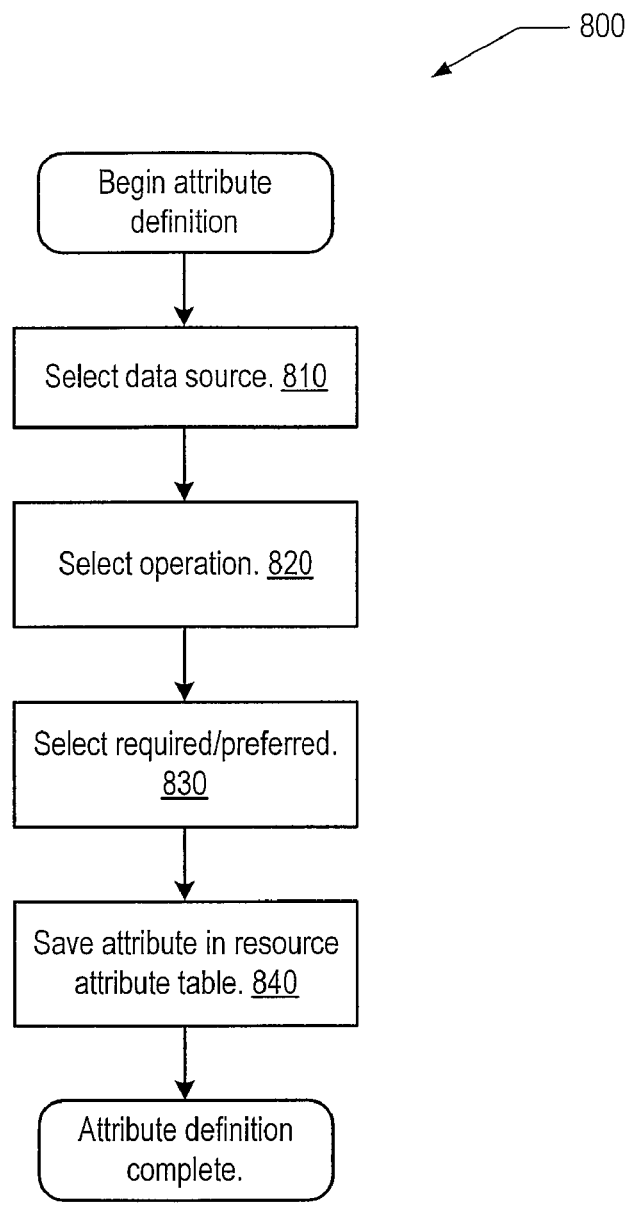
FIG. 8 illustrates one embodiment of a process that may be used to define an attribute.

FIG. 8 illustrates one embodiment of a process 800 that may be used to define an attribute. Process 800 may begin with the selection of a data source (block 810). A data source may be a client or an application. Once a data source is selected, an operation may be selected (block 820). Operations may include any of a backup, a restore, or a post-processing operation such as those described above. Next the attribute may be assigned to be either preferred or required (block 830). Once the data source, operation and required/preferred selections are made, the attribute may be saved in a resource attribute table (block 840), completing the attribute definition. It is noted that in alternative embodiments, the steps of process 800 may be executed in a different order and/or some of the steps may be executed in parallel.

Figure 9:
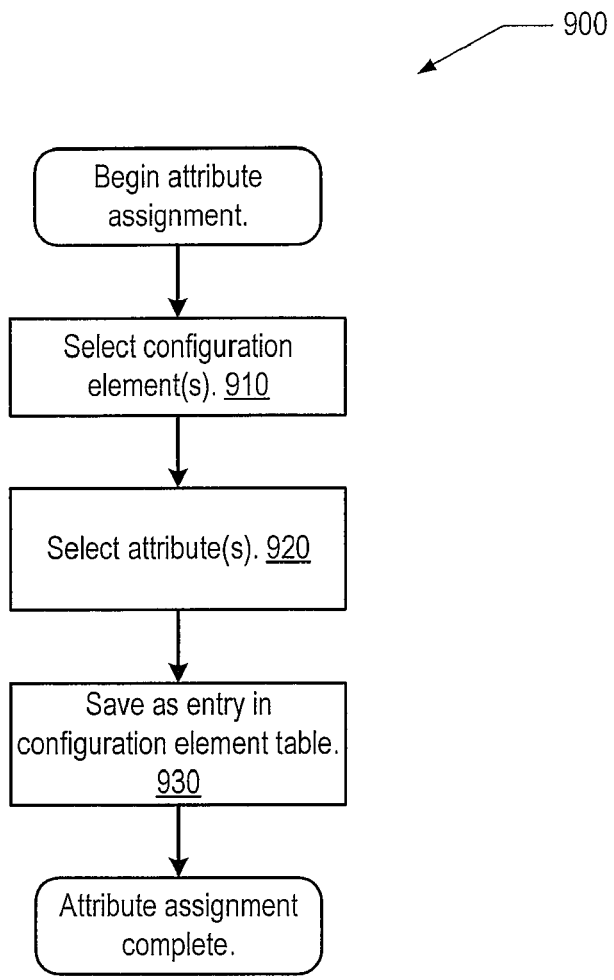
FIG. 9 illustrates one embodiment of a process that may be used to assign an attribute to a configuration element.

FIG. 9 illustrates one embodiment of a process 900 that may be used to assign an attribute to a configuration element. Process 900 may begin with selection of one or more configuration elements (block 910) such one or more of the configuration elements described above. Next, associated attributes may be selected (block 920), such as one or more of the attributes described above. Once a set of configuration elements and attributes have been selected and associated, they may be saved as an entry in a configuration element table (block 930), completing the attribute assignment. The steps of process 900 may be performed in any of a variety of ways including, in one embodiment, using a graphical user interface as described in FIGS. 5-7 above. It is noted that in alternative embodiments, the steps of process 900 may be executed in a different order and/or some of the steps may be executed in parallel.

Figure 10:
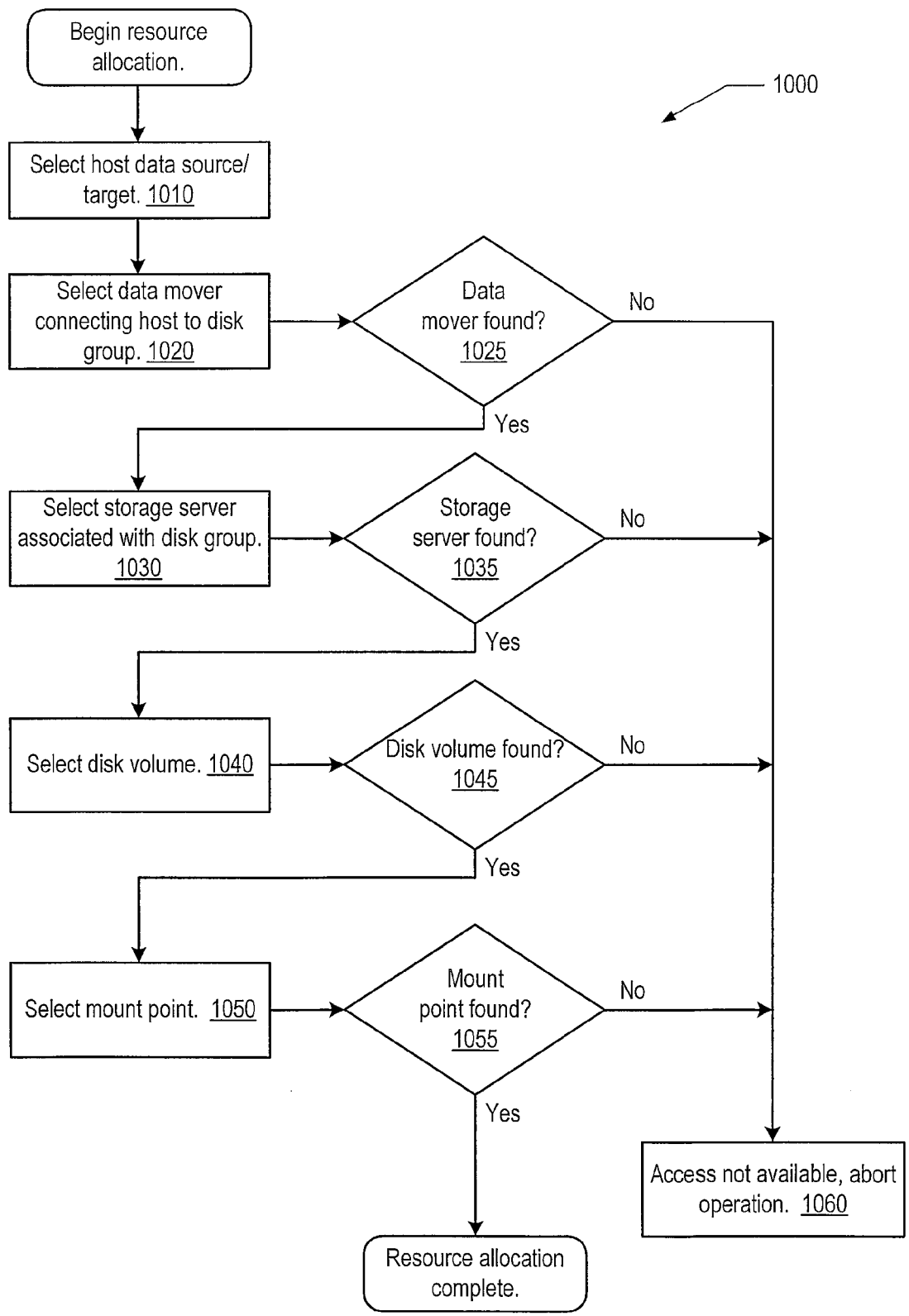
FIG. 10 illustrates one embodiment of a process that may be used to allocate storage resources to a backup operation.

FIG. 10 illustrates one embodiment of a process 1000 that may be used to allocate storage resources to a backup operation. Process 1000 may begin with selection of a host to be either a source of data or a target for data in a backup-related operation (block 1010). Host selection may include selecting a host that has one or more required or preferred attributes that are associated with a particular backup operation of interest. In alternative embodiments, various other configuration elements may be defined in association with a host, assigned attributes, and considered during selection of a host.

Having selected a host, a data mover may then be selected (block 1020) connecting the selected host to a disk group. Data mover selection may include selecting a data mover that is associated with a path between a host and a LUN having one or more required or preferred attributes that are associated with a particular backup operation of interest. In alternative embodiments, various other configuration elements may be defined in association with a data mover, assigned attributes, and considered during selection of a data mover. If no data movers are available having the required or preferred attributes to connect the selected host to a disk group (decision block 1025), the backup operation may be aborted (block 1060).

Once a data mover has been selected, a storage server that is associated with the disk group, the host, and the selected data mover may be selected (block 1030) to provide access to the selected disk group. Storage server selection may include selecting a storage server path that has one or more required or preferred attributes that are associated with a particular backup operation of interest. In alternative embodiments, various other configuration elements may be defined in association with a storage server, assigned attributes, and considered during selection of a storage server. If no storage server paths having the required or preferred attributes are available to provide access to the selected disk group (decision block 1035), the backup operation may be aborted (block 1060).

Once a storage server has been selected, a disk volume within the selected disk group may be selected (block 1040). Disk volume selection may include selecting a LUN that has one or more required or preferred attributes that are associated with a particular backup operation of interest. In alternative embodiments, various other configuration elements may be defined in association with a disk volume, assigned attributes, and considered during selection of a disk volume. If no disk volumes having the preferred or required attributes are associated with the selected disk group (decision block 1045), no storage space is available and the backup operation may be aborted (block 1060).

Once a disk volume has been selected, a mount point may be selected to describe actual access to the selected disk volume (block 1050). Mount point selection may include selecting a mount point to host connection that has one or more required or preferred attributes that are associated with a particular backup operation of interest. In alternative embodiments, various other configuration elements may be defined in association with a mount point, assigned attributes, and considered during selection of a mount point. If no mount points having the required or preferred attributes are associated with a disk volume (decision block 1055), storage in the disk volume cannot be accessed and the backup operation may be aborted (block 1060). Once a mount point is found for the selected disk volume, resource allocation is complete. It is noted that in alternative embodiments, the steps of process 1000 may be executed in a different order and/or some of the steps may be executed in parallel.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for allocating resources for use in a backup operation, the method comprising:
   creating a configuration element table comprising a plurality of entries which correspond to one or more storage resources and are associated with one or more user-defined attributes having values which indicate whether a storage resource is preferred or required for a type of backup operation, wherein each entry of the plurality of entries includes:
      an identification of a given storage resource including at least one of a logical unit number (LUN), a mount point providing access to at least one LUN, and a host having access to a mount point;
      an identification of one or more of a plurality of backup operations; and
      a user-defined attribute that indicates the given storage resource is either required or preferred for each of the one or more of a plurality of backup operations;
   creating a configuration for a given backup operation of the plurality of backup operations, wherein said configuration includes one or more storage resources to be used in the given backup operation, wherein each storage resource in the configuration is selected from the configuration element table based on the value of an associated attribute in an entry of the plurality of entries;
   storing the configuration for use in subsequent backup operations;
   initiating a backup operation that corresponds to the given backup operation;
   responsive to initiating the backup operation:
      accessing the configuration for the given backup operation;
      identifying a plurality of storage resources specified in the configuration;
      for each storage resource of the plurality of storage resources identified by the configuration:
         accessing the configuration element table;
         determining whether a storage resource included in the configuration element table that corresponds to the storage resource identified by the configuration is available for allocation; and
         allocating the storage resource included in the configuration element table for use in the backup operation if the storage resource in the configuration element table is determined to be available;
         aborting the backup operation if a storage resource specified in the configuration is not available for allocation.

2. The method of claim 1, wherein the given backup operation is selected from the group comprising:
   image backup;
   image restore;
   backup image synthesizing;
   backup image staging;
   backup image duplication;
   backup image replication;
   backup image compressing;
   backup image decompressing;
   backup image de-duplication; and
   backup image indexing.

3. The method of claim 1, wherein the configuration element table of storage resources and the configuration are created at run time of the backup application.

4. The method of claim 1, wherein either a data source or a data target of the backup operation is a client in a client-server system.

5. The method of claim 1, wherein either a data source or a data target of the backup operation is an application program.

6. A computer system comprising:
   a plurality of interconnected storage resources;
   a client computer coupled to the plurality of interconnected storage resources via a network, wherein the client computer comprises a backup application;
   wherein the backup application is configured to:
      create a configuration element table comprising a plurality of entries which correspond to one or more storage resources of the plurality of interconnected storage resources and are associated with one or more user-defined attributes having values which indicate whether a storage resource is preferred or required for a type of backup operation, wherein each entry of the plurality of entries includes:
         an identification of a given storage resource including at least one of a logical unit number (LUN), a mount point providing access to at least one LUN, and a host having access to a mount point;
         an identification of one or more of a plurality of backup operations; and
         a user-defined attribute that indicates the given storage resource is either required or preferred for each of the one or more of a plurality of backup operation;
      create a configuration for a given backup operation of the plurality of backup operations, wherein said configuration includes one or more storage resources to be used in the given backup operation, wherein each storage resource in the configuration is selected from the configuration element table based on the value of an associated attribute in an entry of the plurality of entries;
      store the configuration for use in subsequent backup operations;
      initiate a backup operation that corresponds to the given backup operation;
      responsive to initiating the backup operation:
         access the configuration for the given backup operation;
         identify a plurality of storage resources specified in the configuration;
         for each storage resource of the plurality of storage resources identified by the configuration:
            access the configuration element table;

determine whether a storage resource included in the configuration element table that corresponds to the storage resource identified by the configuration is available for allocation; and allocate the storage resource included in the configuration element table for use in the backup operation if the storage resource in the configuration element table is determined to be available;

abort the backup operation if a storage resource specified in the configuration is not available for allocation.

7. The system as recited in claim 6, wherein the given backup operation is selected from the group comprising:
image backup;
image restore;
backup image synthesizing;
backup image staging;
backup image duplication;
backup image replication;
backup image compressing;
backup image decompressing;
backup image de-duplication; and
backup image indexing.

8. The system as recited in claim 6, wherein the configuration element table of storage resources and the configuration are created at run time of the backup application.

9. The system as recited in claim 6, wherein either a data source or a data target of the backup operation is a client in a client-server system.

10. The system as recited in claim 6, wherein either a data source or a data target of the backup operation is an application program.

11. A non-transitory computer readable medium storing computer instructions that are executable by a processor to:
create a configuration element table comprising a plurality of entries which correspond to one or more storage resources and are associated with one or more user-defined attributes having values which indicate whether a storage resource is preferred or required for a type of backup operation, wherein each entry of the plurality of entries includes:
an identification of a given storage resource including at least one of a logical unit number (LUN), a mount point providing access to at least one LUN, and a host having access to a mount point;
an identification of one or more of a plurality of backup operations; and
a user-defined attribute that indicates the given storage resource is either required or preferred for each of the one or more of a plurality of backup operations;

create a configuration for a given backup operation of the plurality of backup operations, wherein said configuration includes ef one or more storage resources to be used in the given backup operation, wherein each storage resource in the configuration is selected from the configuration element table based on the value of an associated attribute in an entry of the plurality of entries;
store the configuration for use in subsequent backup operations;
initiate a backup operation that corresponds to the given backup operation;
responsive to initiating the backup operation:
access the configuration for the given backup operation;
identify a plurality of storage resources specified in the configuration;
for each storage resource of the plurality of storage resources identified by the configuration:
access the configuration element table;
determine whether a storage resource included in the configuration element table that corresponds to the storage resource identified by the configuration is available for allocation; and
allocate the storage resource included in the configuration element table for use in the backup operation if the storage resource in the configuration element table is determined to be available;
abort the backup operation if a storage resource specified in the configuration is not available for allocation.

12. The non-transitory computer readable medium of claim 11, wherein the given backup operation is selected from the group comprising:
image backup;
image restore;
backup image synthesizing;
backup image staging;
backup image duplication;
backup image replication;
backup image compressing;
backup image decompressing;
backup image de-duplication; and
backup image indexing.

13. The non-transitory computer readable medium of claim 11, wherein the configuration element table of storage resources and the configuration are created at run time of the backup application.

14. The non-transitory computer readable medium of claim 11, wherein either a data source or a data target of the backup operation is an application program.

* * * * *

UNITED STATES PATENT AND TRADEMARK OFFICE
CERTIFICATE OF CORRECTION

PATENT NO. : 8,326,804 B2
APPLICATION NO. : 12/134853
DATED : December 4, 2012
INVENTOR(S) : Stephan Gipp et al.

It is certified that error appears in the above-identified patent and that said Letters Patent is hereby corrected as shown below:

In the Claims:

Claim 11, column 12, line 3, please delete "ef" before "one or more storage resources".

Signed and Sealed this
Nineteenth Day of March, 2013

Teresa Stanek Rea
*Acting Director of the United States Patent and Trademark Office*